March 26, 1968     I. D. DE BELLA     3,374,554
EDUCATIONAL OR TEACHING DEVICE FOR DEMONSTRATING
THE SEVERAL ACTIONS OF THE LUNGS AND
BLOOD VESSELS IN A HUMAN BODY
Filed Oct. 22, 1965

INVENTOR

ISABELLE D. DeBELLA

BY John B. Dickman III
AGENT

United States Patent Office 3,374,554
Patented Mar. 26, 1968

3,374,554
EDUCATIONAL OR TEACHING DEVICE FOR DEMONSTRATING THE SEVERAL ACTIONS OF THE LUNGS AND BLOOD VESSELS IN A HUMAN BODY
Isabelle D. De Bella, 4105 Wisconsin Ave. NW., Apt. 301, Washington, D.C. 20016
Filed Oct. 22, 1965, Ser. No. 500,715
2 Claims. (Cl. 35—17)

ABSTRACT OF THE DISCLOSURE

An educational device for teaching and demonstrating the actions of the lungs, blood vessels and diaphragm in a body during the inhaling and exhaling processes.

This invention relates to an improved educational or teaching device for demonstrating the several actions of the lungs and blood vessels in a human body when inhaling and exhaling during the normal process of breathing.

An object of the invention is to provide an improved educational or teaching device for demonstrating the several actions of the lungs and blood vessels in a human body when subjected to a positive and a negative pressure as in the normal process of breathing.

A further object of the invention is to provide a mechanical and educational device for teaching the several actions of the lungs, blood vessels and diaphragm in a human body when subjected to intermittent positive and negative pressures, as in the normal process of breathing.

A still further object of the invention is to provide an improved educational and teaching device which may be used in medical classes for demonstrating the several actions of the lungs, blood vessels and expanding and contracting diaphragm when subjected to positive and negative pressures, as in the normal process of breathing.

Another object of the invention is to provide an improved educational and training device for demonstrating the several actions of the lungs, blood vessels and diaphragm during the normal process of breathing, which device will be highly efficient in operation and relatively inexpensive to manufacture and produce.

Other objects will appear as the description proceeds.

Figure 1:
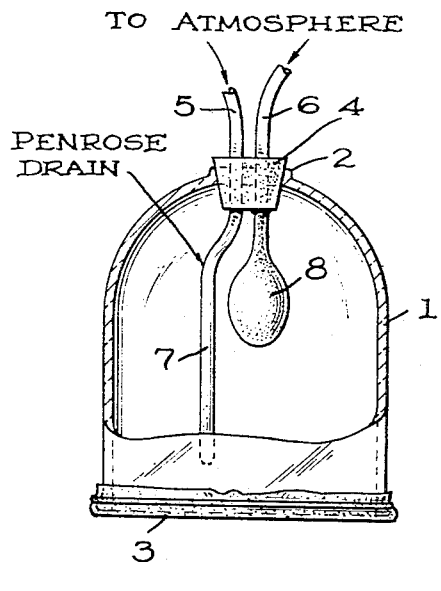
Figure 2:
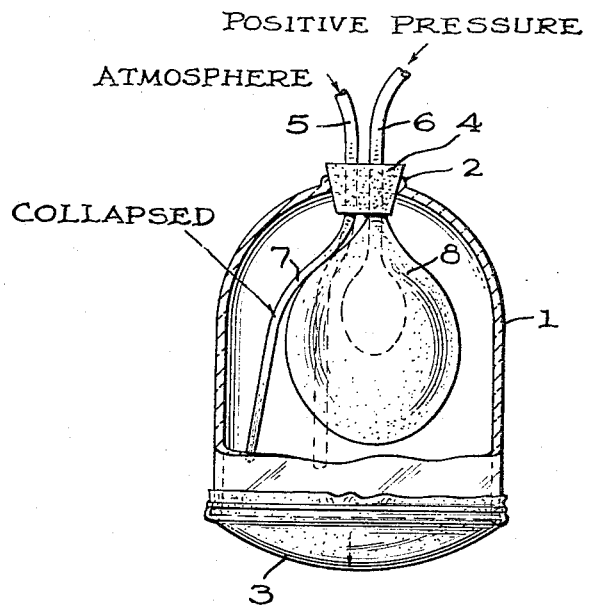
Figure 3:
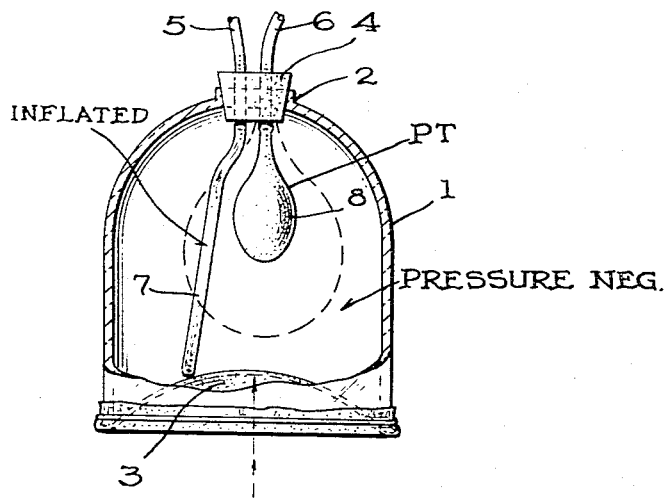

In the accompanying drawings which form a part of my application:

FIGURE 1 is a side elevation of my educational and teaching device, partly broken away and in section to show the several internal structures in the receptacle when subjected to neither positive nor negative pressure;

FIGURE 2 is a side elevation of my educational and teaching device, partly broken away and in section to show the several internal structures in the receptacle when subjected to a positive pressure as in the inhaling process; and FIGURE 3 is a side elevation of my educational and teaching device partly broken away and in section to show the several internal structures in the receptacle when subjected to a negative pressure, as in the exhaling process.

Like characters of reference are used throughout the following specification and the accompanying drawings to designate corresponding parts.

In carrying out my invention, I provide a bell-shaped receptacle 1 of transparent glass having an opening 2 through its upper end and an expandable rubber diaphragm 3 across its open end, representing the chest wall and stomach wall, respectively, in a human body. A rubber cork 4 will be inserted through the upper end opening 2 in the receptacle 1, and will have rubber or plastic tubes 5 and 6 extending therethrough and into the inside of the receptacle 1. A penrose drain 7 will be secured to the inner end of the tube 5 to extend downwardly interiorly of the receptacle 1 to be normally inflated. An inflatable balloon 8 will be secured to the inner end of the tube 6 to extend downwardly within the receptacle 1 adjacent the penrose drain tube 7, and will be normally in its deflated condition.

The tube 5 will be open to the atmosphere, while the tube 6 will be connected to a valved bulb pump (not shown) for applying either a positive pressure to inflate the balloon 8 thereby deflating the penrose drain to collapse the same to represent blood leaving the tissues of a human body, or a negative pressure to deflate the balloon 8 thereby again inflating the penrose drain to indicate the return of blood to the tissues of a human body.

As clearly shown in the drawings, the diaphragm 3 will be expanded downwardly when the device is subjected to a positive pressure simulating the inhalation of the breath, and will be drawn into the receptacle 1 when the device is subjected to a negative pressure simulating the exhaling of the breath from the lungs of a human body.

From the foregoing description, when taken with the accompanying drawings, it will be apparent that I have devised a highly efficient visual device for teaching the several coordinated functions and operations of the lungs, blood vessels, and diaphragm in a human body.

Many minor changes in detail of construction may be resorted to without departure from the spirit of the invention.

Having thus described my invention, what I claim as new and desire to secure by Letters Patent of the United States is:

1. An educational and teaching device for demonstrating the several coordinated functions and operations of the lungs, blood vessels, and diaphragm in a human body, comprising, a closed receptacle, an expandable diaphragm closing the bottom end of said receptacle, a penrose drain tube in said receptacle, an inflatable balloon in said receptacle adjacent said penrose tube for collapsing and inflating said penrose drain, and for expanding and contracting said diaphragm, and means for selectively applying positive pressure to said balloon and to said receptacle to expand and contract said diaphragm.

2. An educational and teaching device for demonstrating the several functions and operations of the lungs, blood vessels, and diaphragm in a human body, comprising, a bell-shaped transparent receptacle having openings in its opposite ends, a removable cork in the upper opening of said receptacle and a diaphragm across the lower opening tubes extending through said cork into the interior of said receptacle, a penrose drain in said receptacle attached to the inner end of one of said tubes, an inflatable balloon in said receptacle adjacent said penrose drain attached to another of said tubes for collapsing and inflating said penrose drain by engagement therewith, said tube connected to said penrose drain being open to the atmosphere, and means connectable with the other tube for alternately applying a positive and a negative pressure to said balloon and to said receptacle.

References Cited

UNITED STATES PATENTS

| 3,154,881 | 11/1964 | Elwell | 35—17 X |
| 3,199,511 | 8/1965 | Kulick | 128—214 |
| 3,273,261 | 9/1966 | Lovercheck | 35—17 |

EUGENE R. CAPOZIO, Primary Examiner.

E. S. BURR, Examiner.